United States Patent [19]

Schroeder et al.

[11] 4,184,243

[45] Jan. 22, 1980

[54] METHOD FOR REMOVING TUBES FROM A TUBESHEET

[75] Inventors: Joseph W. Schroeder, Clark; Myron T. Krawchuk, Newton, both of N.J.

[73] Assignee: Foster Wheeler Energy Corporation, Livingston, N.J.

[21] Appl. No.: 952,178

[22] Filed: Oct. 17, 1978

[51] Int. Cl.² .............................................. B23P 19/02
[52] U.S. Cl. ...................................... 29/427; 29/280; 29/282; 279/2 R; 29/255
[58] Field of Search ................... 29/427, 157.3 C, 255, 29/263, 280, 282, 401 F, 235; 279/2 R, 2 A, 1 Q

[56] References Cited

U.S. PATENT DOCUMENTS

| 1,879,663 | 9/1932 | Dreyer | 72/56 |
| 3,057,631 | 10/1962 | Fleur | 279/2 R |
| 3,341,930 | 9/1967 | Belanger | 29/401 |
| 3,900,939 | 8/1975 | Greacen | 29/401 F |
| 4,068,372 | 1/1978 | Kamohara et al. | 29/282 X |
| 4,104,775 | 8/1978 | Lawless | 29/280 |

*Primary Examiner*—Milton S. Mehr
*Attorney, Agent, or Firm*—Marvin A. Naigur; John E. Wilson; John J. Herguth, Jr.

[57] ABSTRACT

A method for removing a tube from an opening in a tubesheet in which a containment plug is placed in the tube at a predetermined distance from the end of the tube and a granular material is placed into a portion of the tube between the plug and the latter tube end. A push rod is applied through the tube end and to said granular material to apply a force to the granular material against the plug to cause the granular material to exert a shear force on the inner wall of the tube of a magnitude to push the tube from the tubesheet opening.

6 Claims, 1 Drawing Figure

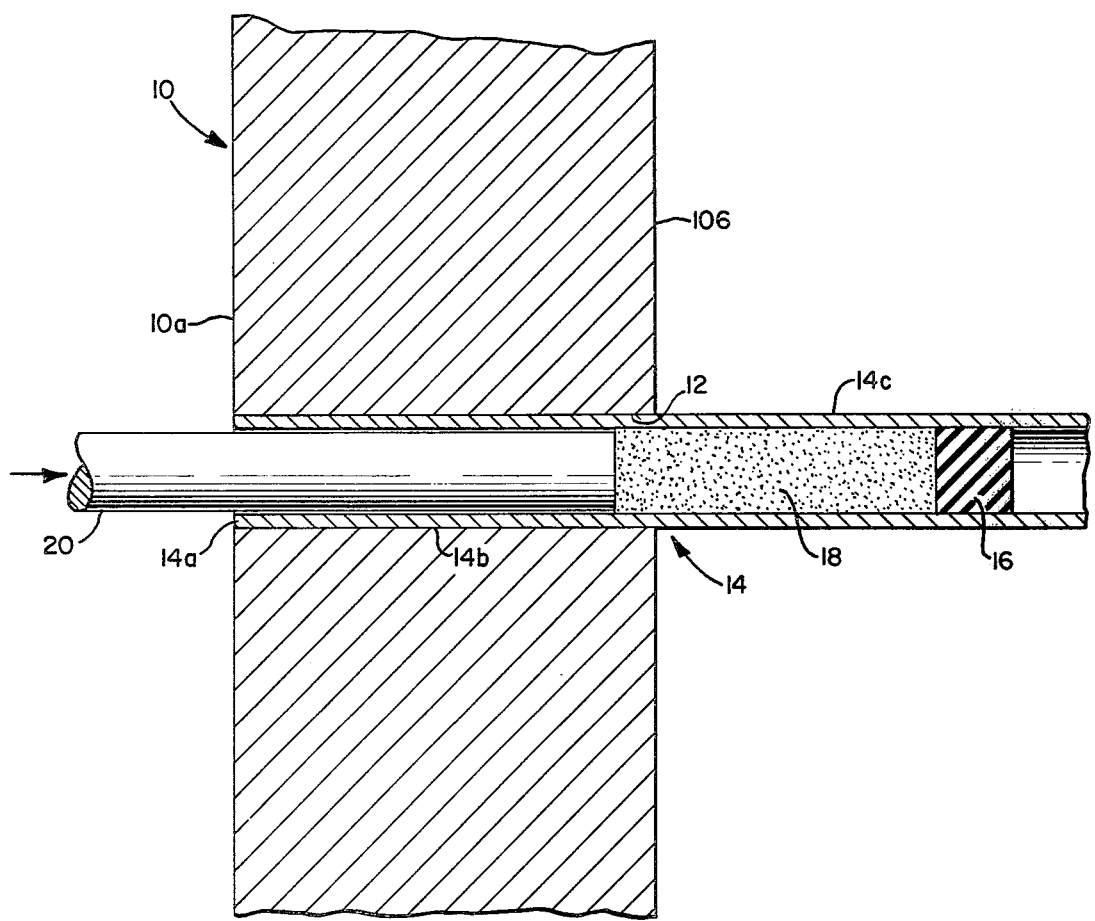

METHOD FOR REMOVING TUBES FROM A TUBESHEET

BACKGROUND OF THE INVENTION

This invention relates to a method for removing a tube from a tubesheet and, more particularly, to such a method in which the tube is forced outwardly from an opening extending through the tubesheet.

A great majority of heat exchangers in use today feature the use of one or more tubesheets having a plurality of openings extending therethrough which receive heat exchange tubes for the passage of heat exchange fluid, such as water, through the tubes in order to pick up heat from a surrounding medium such as steam or the like. In this type of equipment, it is frequently necessary to remove the tubes from the openings for the purpose of replacing or repairing the tubes. Since the tubes are usually tightly secured in these holes by various techniques such as explosive forming, rolling, or the like, relatively large forces are required to remove the tubes from the openings.

However, it is extremely difficult to apply the forces necessary to remove the tubes without damaging the tubes or the tubesheet. According to most of the techniques in use today, the tubes are pulled from the tubesheet in a manner which damages the tubes to an extent that they are unfit for further use and, in addition, often damages the tubesheet requiring costly repairs.

SUMMARY OF THE INVENTION

It is therefore an object of the present invention to provide a unique method for removing tubes from a tubesheet in which minimal damage, if any, is done to the tube and/or the tubesheet.

It is a further object of the present invention to provide a method of the above type in which the tube is pushed from the tubesheet in a simple and efficient manner requiring a minimum of expensive equipment.

It is a still further object of the present invention to provide a method of the above type in which a shear force is exerted on the inner wall of the tube in a manner to push the tube free of the tubesheet opening leaving the latter untouched and resulting in little, if any, damage to the tube and/or the tubesheet.

The method of the present invention is designed to fulfill these and other objects and includes the placing of a plug in the tube at a predetermined distance from the end of the tube. A granular material is then disposed in the tube between the plug and the latter tube end. A push rod is applied through the tube end and against the granular material and the plug at a force sufficient to cause the granular material to exert a shear force on the inner wall of the tube. The shear force is of a magnitude that will remove or push the tube from the tubesheet opening with a minimum of damage to the tube and to the tubesheet.

BRIEF DESCRIPTION OF THE DRAWING

The above brief description, as well as further objects, features, and advantages, of the present invention will be more fully appreciated by reference to the following detailed description of presently preferred but nonetheless illustrative embodiment in accordance with the present invention, when taken in connection with the accompanying drawing which is a longitudinal sectional view depicting a portion of the tubesheet and a tube being removed according to the method of the present invention.

DESCRIPTION OF THE PREFERRED EMBODIMENT

The present method is best described in connection with the drawing in which the reference numeral 10 refers in general to a portion of a tubesheet utilized in a heat exchange apparatus such as a steam-water heat exchanger. In this type of apparatus, the tubesheet 10 is placed at one end of a vessel and has an outer face 10a and an inner face 10b. A plurality of openings, one of which is shown by the reference numeral 12, extend longitudinally through the tubesheet 10 with the actual number of openings 12 that extend through the tubesheet 10 varying with the particular design.

A heat exchange tube 14 is provided for each opening 12 and has an end 14a extending flush with the outer face of the tubesheet 10 and a portion 14b extending within the opening. The remaining portion 14c of the tube 14 extends internally of the heat exchange vessel. A tubesheet identical to the tubesheet 10 may be provided at the other end of the vessel for receiving the other ends of the tubes or, alternatively, the tubes can bend around with their other ends also extending through similar openings through the same tubesheet 10.

As indicated above, the tube 14 is secured relative to the tubesheet by explosively forming or rolling the portion 14b of the tube relative to the inner wall defining the opening 12. Since the particular technique for securing the tube 14 relative to the tubesheet 10 is not of particular significance in the present application it will not be described in any further detail.

According to the method of tube removal of the present invention, a containment plug 16 which may be of rubber, felt, cork, or the like, is placed within the interior of the tube at a predetermined distance from the tube end 14a. This distance is preferably approximate to that shown in the drawing, i.e., with the plug 16 being spaced a slight distance from the inner face 10b of the tubesheet. It is understood that the plug 16 can be placed in the tube in any manner, such as by a rod, or the like, and is sized and designed such as to withstand predetermined forces directed in a direction from left to right as viewed in the drawing and as will become more apparent from the following description.

After the containment plug 16 is secured within the tube 14, a granular or grit-like material, such as sand, shown by the reference numeral 18, is placed in the tube and against the outer face of the plug 16. The granular material 18 can extend from the latter face of the plug 16 to a point just inside the inner face 10b of the tubesheet as shown in the drawing.

After the granular material 18 is in place within the interior of the tube, a push rod 20 is inserted through the tube end 14a and into the tube portion 14b until it abuts against the granular-like material. Then a predetermined axial force is applied against the push rod in a direction indicated by the arrow in the drawing by an external source (not shown), such as a hydraulic ram, or the like, which applies the force to the granular material 18. This compacts the latter material against the plug 16 and therefore against the surrounding inner wall of the tube 14. As a result, the axial load from the rod 20 is transformed, via the granular material, to a shear force applied to the latter inner wall of a sufficient magnitude to push the tube free of the tubesheet opening 12.

It is thus seen that according to the method of the present invention, a simple yet efficient technique is provided for removing a tube from a tubesheet with minimal damage, if any, to the tube or to the tubesheet.

It is understood that several variations may be made in the foregoing without departing from the scope of the invention. For example, the exact location of the containment plug 16 and therefore the granular material 18 is not limited to that specified in the foregoing. Also, the particular type of granular material and the particular type of containment plug utilized can be varied within the scope of the present invention.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention.

We claim:

1. A method for removing a tube from an opening in a tubesheet, comprising the steps of placing a plug in the tube at a predetermined distance from the end of the tube that extends into the tubesheet opening, placing a granular material into at least a portion of that portion of the tube extending between said plug and said tube end, and applying a force to said granular material sufficient to cause said granular material to exert a shear force on the inner wall of said tube of a magnitude to push the tube from said tubesheet opening.

2. The method of claim 1, wherein said opening is a through passage extending through said tubesheet.

3. The method of claims 1 or 2, wherein said tube normally extends into said tubesheet with said tube end extending flush with one face of said tubesheet and wherein said plug is placed in the remaining portion of said tube at a spaced relation to the other face of said tubesheet.

4. The method of claim 3, wherein said granular material extends from said plug to a location in said tube within said tubesheet opening.

5. The method of claim 1, wherein said granular material is sand.

6. The method of claim 1, wherein said force is applied to said granular material by the steps of introducing a push rod through said tube end and applying an axial force to said rod which is transferred to said granular material.

* * * * *